United States Patent
May-Weymann et al.

(10) Patent No.: US 9,155,120 B2
(45) Date of Patent: Oct. 6, 2015

(54) CALL ESTABLISHMENT

(71) Applicant: Nvidia Corporation, Santa Clara, CA (US)

(72) Inventors: Alexander May-Weymann, Sophia Antipolis (FR); Timothy Rogers, Cambridge (GB); Susan Iversen, Herts (GB); Stephen Molloy, Cambridge (GB)

(73) Assignee: Nvidia Corporation, Santa Clara, CA (US)

( * ) Notice: Subject to any disclaimer, the term of this patent is extended or adjusted under 35 U.S.C. 154(b) by 153 days.

(21) Appl. No.: 14/026,489

(22) Filed: Sep. 13, 2013

(65) Prior Publication Data

US 2015/0079948 A1    Mar. 19, 2015

(51) Int. Cl.
*H04M 3/42* (2006.01)
*H04W 76/02* (2009.01)

(52) U.S. Cl.
CPC .................................. *H04W 76/027* (2013.01)

(58) Field of Classification Search
CPC .................................................. H04W 76/027
USPC ........... 455/410, 411, 414.1; 370/338; 705/64
See application file for complete search history.

(56) References Cited

U.S. PATENT DOCUMENTS

2005/0220119 A1* 10/2005 Rajsic ...................... 370/395.52
2008/0152126 A1*  6/2008 Pitkamaki et al. ............ 379/418

OTHER PUBLICATIONS

"Digital Cellular Telecommunications System (Phase 2+); Universal Mobile Telecommunications System (UMTS); LTE; Mobile Radio Interlace Layer 3 Specification; Core Networks Protocols; Stage 3," 3GPP, ETSI TS 24.008 Version 11.7.0 Release 11, Jul. 2013, 678 pages.
"3rd Generation Partnership Project; Technical Specification Group Radio Access Network; Radio Resource Control (RRC); Protocol Specification (Release 11)," 3GPP TS 25.331, V11.6.0, Jun. 2013, 2084 pages.

\* cited by examiner

*Primary Examiner* — Marcos Batista

(57) ABSTRACT

A modem for use at a terminal, the modem comprising: a first interface arranged to connect to a communications network; a second interface arranged to connect to a host processor on the terminal; and a processing unit, the processing unit configured to: detect that a call is to be established over the communications network; in response to said detection, perform a call setup procedure; determine if the call setup procedure has been successful or has failed due to failure of a security procedure; and in response to determining that the call setup procedure has failed due to failure of a security procedure, repeat said call setup procedure without indicating failure of the call setup procedure to a user of said terminal.

21 Claims, 3 Drawing Sheets

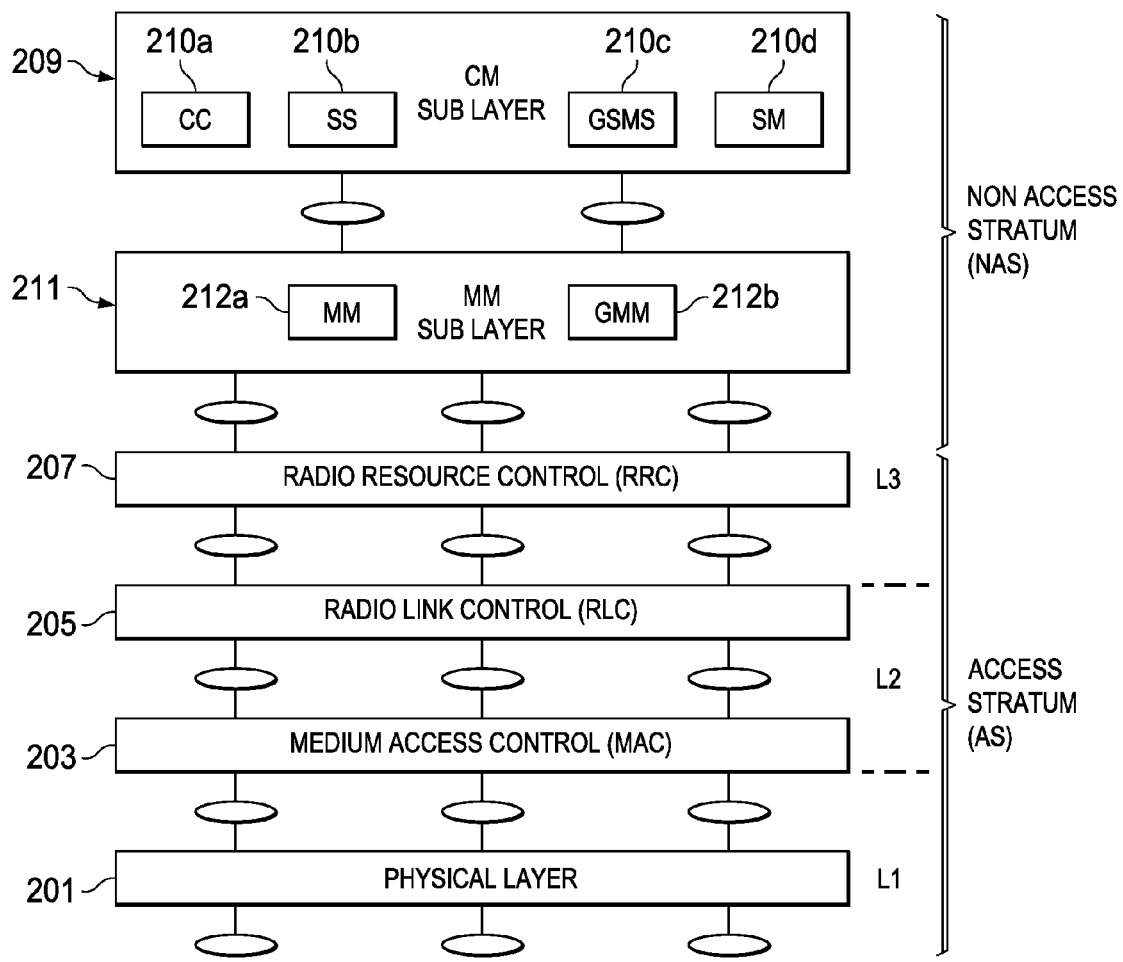
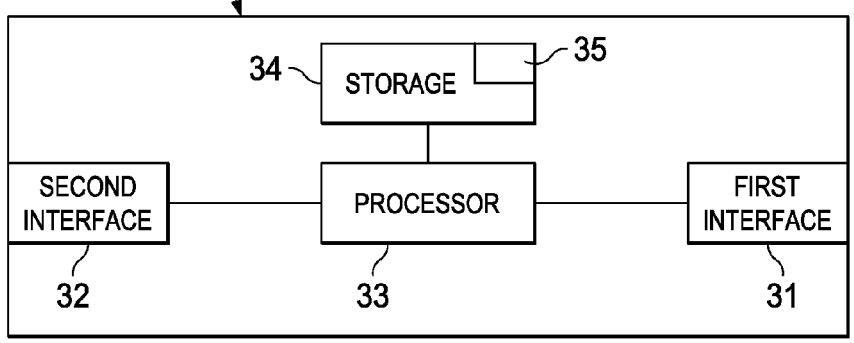

CALL ESTABLISHMENT

TECHNICAL FIELD

This disclosure relates to handling call establishment at a user equipment.

BACKGROUND

In a communication system, a device (typically a mobile device) termed user equipment (UE) communicates wirelessly with a core network via a radio access network. Communications between the UE and the radio access network are effected in accordance with a multi-layered communications protocol.

Upon detecting that a call is to be established, the UE implements a procedure to establish a Radio Resource Control (RRC) connection between the UE and the radio access network. This known procedure is described in the 3GPP TS 25.331 specification. If there is a logical connection between the UE and the radio access network, then the UE is said to be in a connected mode. Once in the connected mode, the UE transmits an indication that a mobile originating call is required to the radio access network.

In response to receiving the indication from the UE that a mobile originating call is required, the radio access network initiates a Security Mode Command procedure in order to establish a secure channel between the UE and radio access network. This known security procedure is described in detail in the 3GPP TS 25.331 specification.

The security consists of two aspects, optional ciphering and mandatory integrity protection. Ciphering provides encryption according to a ciphering configuration to ensure that all signalling and data messages transmitted between the UE and the radio access network are ciphered over the air interface to provide data confidentiality. Integrity protection provides protection against message manipulation between the UE and the radio access network. That is, integrity protection prevents third parties from sending unauthorised signaling messages between the UE and the radio access network. Typically, both ciphering and integrity protection are enabled during a call.

As part of the Security Mode Command procedure the radio access network sends a Security Mode Command using the Radio Resource Control (RRC) protocol to the UE with an indication of a new integrity protection configuration and new cipher configuration. In response to receiving the Security Mode Command, the UE sends a RRC Security Mode Command Complete message to the radio access network. The radio access network completes the security mode command procedure successfully when the Security Mode Command Complete message is received.

After sending the Security Mode Command Complete message to the radio access network, the UE transmits a call setup message to the radio access network. If the call setup message is correctly received by the radio access network after the Security Mode Command procedure has successfully completed (i.e. a security configuration has been successfully established between the UE and the radio access network) then the radio access network will respond to the call setup message by transmitting a call proceeding message to the UE 102 and proceed with the known mobile originating call establishment procedure which is described in detail in the 3GPP TS 24.008 specification.

SUMMARY

According to one aspect of the present disclosure there is provided a modem for use at a terminal, the modem comprising: a first interface arranged to connect to a communications network; a second interface arranged to connect to a host processor on the terminal; and a processing unit, the processing unit configured to: detect that a call is to be established over the communications network; in response to said detection, perform a call setup procedure; determine if the call setup procedure has been successful or has failed due to failure of a security procedure; and in response to determining that the call setup procedure has failed due to failure of a security procedure, repeat said call setup procedure without indicating failure of the call setup procedure to a user of said terminal.

According to another aspect of the present disclosure there is provided a method of operating a modem at a terminal, the modem having a processing unit, a first interface arranged to connect to a communications network, and a second interface arranged to connect to a host processor on the terminal, wherein the method comprises: detecting that a call is to be established over the communications network; in response to said detection, performing a call setup procedure; determining if the call setup procedure has been successful or has failed due to failure of a security procedure; and in response to determining that the call setup procedure has failed due to failure of a security procedure, repeating said call setup procedure without indicating failure of the call setup procedure to a user of said terminal.

According to another aspect of the present disclosure there is provided a computer program product for operating a modem for use at a terminal, the modem having a processing unit, a first interface arranged to connect to a communications network, and a second interface arranged to connect to a host processor on the terminal, wherein the computer program product comprises code embodied on a computer-readable medium and configured so as when executed on the processing unit of said modem to perform operations according to any of the methods described herein.

BRIEF DESCRIPTION OF THE DRAWINGS

For a better understanding of the present disclosure and to show how the same may be put into effect, reference will now be made, by way of example, to the following drawings in which:

FIG. 2 shows a block diagram of a UMTS radio interface protocol architecture;

FIG. 3 is a schematic block diagram of a modem;

DETAILED DESCRIPTION

The disclosure recognizes that in some scenarios, the radio access network will abort the Security Mode Command procedure because it has not received the Security Mode Command Complete message in a timely manner i.e. has not received the Security Mode Command Complete message within a predetermined time period from transmitting the Security Mode Command to the UE. That is, the radio access network releases the established RRC connection. The delay in receiving the Security Mode Command Complete message may be caused by, for example, the UE performing cell reselection.

If the radio access network aborts the Security Mode Command procedure, then messages transmitted from the UE to the radio access network after the abortion of the Security Mode Command procedure will not be delivered to the radio access network. For example, in the case of a mobile originating call establishment procedure, the call setup message will have been sent from the UE, but will not be received by the core network. This results in failure of the mobile originating call establishment procedure—this failure is reported to the user of the UE. Should the user want to retry establishing a call, the user must typically initiate this themselves by making appropriate input selection(s) at the UE.

The disclosure identifies a method of handling call establishment at a user equipment which improves a user's experience at the user equipment.

Figure 1:
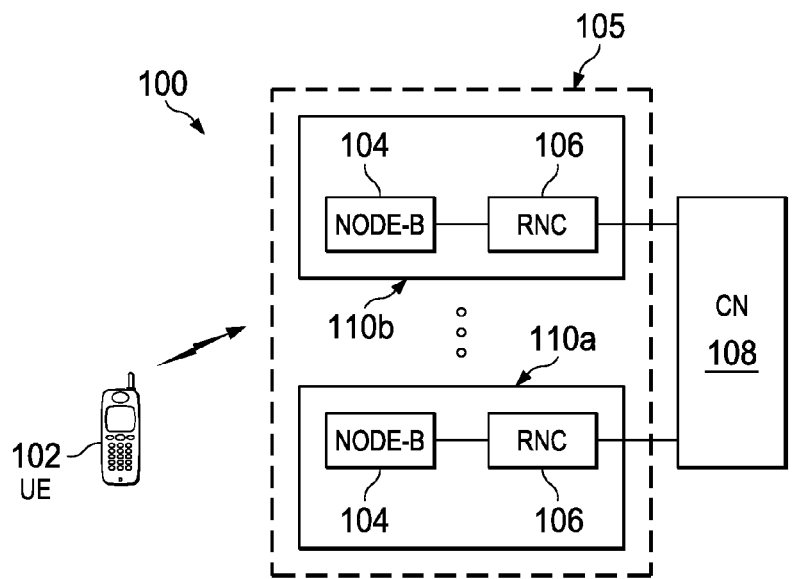
FIG. 1 shows a UMTS mobile communication system.

With reference to FIG. 1, there is illustrated the main elements of a UMTS communication system, generally denoted by reference numeral 100. It will be understood that in FIG. 1 only sufficient elements of the system are shown in order to present the context of some of the arrangements of the disclosure.

The UMTS communication system 100 comprises a wireless communications device termed user equipment (UE) 102. The user equipment 102 may be a mobile telephone, a personal digital assistant (PDA), a computer or any other device that exchanges data wirelessly. The UE 102 is in communication with a UMTS Terrestrial Radio Access Network (UTRAN) 105. The UTRAN 105 comprises one or more radio network sub-systems 110a,110b. A radio network sub-system is a sub-network within the UTRAN 105 and comprises a base station 104 (termed node-B) and a radio network controller (RNC) 106. A node-B 104 is a transceiver which sends and receives wireless signals and defines a cell region. A RNC 106 is the network element responsible for the control of the radio resources of the UTRAN 105. A dedicated physical channel is established between the UE 102 and the node-B 104 to allow data communication to take place there between. It will be appreciated that a plurality of UEs and radio network sub-systems may be present in the UTRAN 105, which for clarity purposes are not shown. The UTRAN 105 is in communication with a core network 108. The structure of a UMTS mobile communication system as illustrated in FIG. 1 is well-known to one skilled in the art, and the further operation of such a system is not described herein.

Figure 1A:
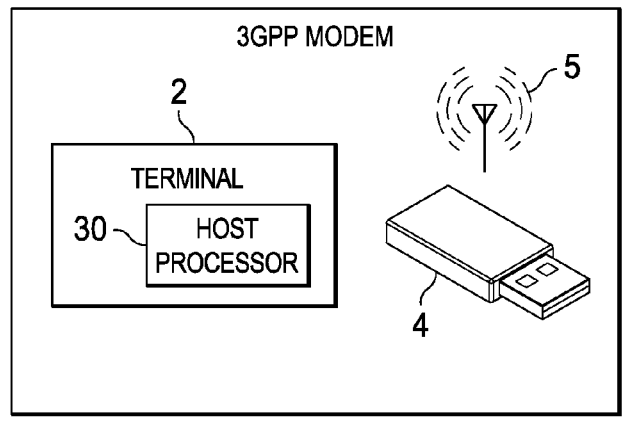
FIGS. 1a and 1b are schematic block diagrams of example configurations of a user equipment.

FIG. 1a is a schematic block diagram of an example configuration of user equipment 102. As shown in FIG. 1a the user equipment 102 comprises host terminal 2 and a modem 4. The host terminal 2 may be a user terminal, and may for example take the form of a desktop computer, laptop computer, tablet style computer, or mobile phone (which may be referred to as a "smart phone"). As shown in FIG. 1a, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 1a, the modem 4 may be external to the host terminal 2 in that it is a separate unit housed in a separate casing, but which is connected or connectable to the host processor 30 of the host terminal 2 by means of a wired or wireless connection (as well as being removable or being able to be disconnected from the host terminal 2).

Figure 1B:
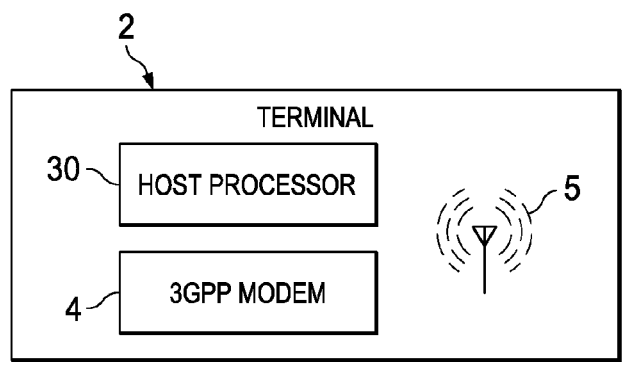

FIG. 1b is schematic block diagram of another example configuration of user equipment 102. As shown in FIG. 1b, the modem 4 may be internal to the host terminal 2, e.g. taking the form of a wireless module in the host terminal 2. For example, both the modem 4 and host processor 30 may be housed within the same casing of the host terminal 2. For example the modem 4 may be internal to a mobile phone 2, and connected to the host processor 30 of the mobile phone 2 by way of a wired connection.

Referring to FIG. 2, there is shown a simplified block diagram of a UMTS radio interface protocol architecture 200. Communications between the UE 102 and the core network 108 via the UTRAN 105 are effected in accordance with the multi-layered communications protocol shown in FIG. 2. The UE 102 and core network 108 include both AS and NAS layers whereas the Node-B 104 and RNC 106 include only AS layers.

The multi-layered communications protocol is typically represented as comprising an access stratum (AS) which includes a plurality of layers responsible for transporting data between the UE and the radio access network, and a Non-access stratum (NAS) which represents a set of higher layer protocols which use the AS to transfer data between the UE and the radio access network. The NAS is divided into two sub-layers: the Connection Management (CM) sub-layer and the Mobility Management (MM) sub-layer. The CM sub-layer includes call control protocol entities which are responsible for establishing, maintaining and terminating calls between the UE and core network.

The protocol architecture comprises an AS which includes a plurality of layers, the plurality of layers including a first layer (L1) which includes a physical layer 201, above the first layer is a second layer (L2) which includes a Medium Access Control (MAC) layer 203 and a Radio Link Control (RLC) layer 205, and above the second layer is a third layer (L3) which includes a Radio Resource Control (RRC) layer 207.

Control interfaces (not shown in FIG. 2) between the RRC layer 207 and all the lower layer protocols are used by the RRC layer 207 to configure characteristics of the lower layer protocol entities, including parameters for the physical, transport and logical channels.

The RLC layer 205 provides services to higher layers for the transfer of user and/or control data. The service provided for user data is called Radio Bearer (RB) and the service provided for control data is called Signalling Radio Bearer (SRB). A SRB is associated with a signalling radio bearer queue and a logical channel. The RLC layer 205 may comprise multiple SRB's such that each SRB is associated with a signalling radio bearer queue and a logical channel. A SRB specifies the characteristics of a logical, transport and physical channel being used to transfer data between the UE 102 and core network 108, and different SRBs may be specified depending on the type of messages that are transferred.

When data is transmitted from the UE 102 to the UTRAN 105, data is passed from the RLC layer 205 to the MAC layer 203 using logical channels. The logical channel defines the type of information that is transferred. These logical channels include a common control channel (CCCH) and a dedicated control channel (DCCH). The CCCH is a bidirectional channel for transmitting control information between the UE 102 and the UTRAN 105. The DCCH is a bidirectional channel for transmitting control information between the UE 102 and the UTRAN 105, wherein the control information is dedicated to the particular UE. Other logical channels are well known to the persons skilled in the art and are not described herein. In the MAC layer 203 the logical channels are mapped to transport channels. In the physical layer 201 the transport channels are mapped onto physical channels. Thus with reference to FIG. 2, it can be seen that during a data transmission from the UE 102 to the UTRAN 105 data is passed down through the layer architecture 200. Similarly, when data is received at the UE 102 from the UTRAN 105, data is passed up through the layer architecture 200.

The NAS makes use of the AS to transfer data between the UE 102 and the core network 108 via the radio access network 105. As described above, the NAS is divided into two sub-layers: the Connection Management (CM) sub-layer 209 and the Mobility Management (MM) sub-layer 211. Both of these sub-layers belong to layer 3 of the overall protocol stack 200.

The CM sub-layer 209 comprises a call control (CC) entity 210*a*, a session management (SM) entity 210*b*, a GPRS SMS (GSMS) entity 210*c*, and a supplementary services (SS) entity 210*d*. The MM sub-layer 211 provides connectivity for the CM sub-layer 209 and comprises a mobility management (MM) entity 212*a* and GPRS mobility management (GMM) entity 212*b*. The MM entity 212*a* within the MM sub-layer 211 and the CC entity 210*a* within the CM sub-layer 209 are associated with circuit switched (CS) domain services, whereas the GMM entity 212*b* within the MM sub-layer 211 and the SM entity 210*d* within the CM sub-layer 209 are associated with packet switched (PS) domain services. The set of CM sub-layer entities shown in FIG. 2 is not exhaustive and other entities could be included.

The call control entity 210*a* of the CM sub-layer 209 is responsible for establishing, maintaining and terminating calls for the CS domain. In particular the call control entity 210*a* is responsible for establishing both mobile originated and mobile terminated calls for the CS core network (i.e. voice and video calls). Mobile originated calls can either be normal or emergency calls, whereas mobile terminated calls can only be a normal call (because emergency calls terminate at a fixed line rather than at a mobile).

Call establishment implemented by the UE 102 will now be described with reference to FIGS. 3-5.

Referring to FIG. 3, the modem 4 may comprise a processor 33 and, operatively coupled to the processor 33, a non-transitory computer-readable storage medium 34 such as a magnetic or electronic memory storing soft-modem code. The code on the storage medium 34 is arranged to be executed on the processor 33 and to perform operations of the modem 4 as discussed below. However, the possibility of some or all of the modem functionality being implemented in dedicated hardware is not excluded.

The modem 4 comprises a first interface 31. With reference to FIG. 1*a*, the first interface may comprise a wireless transceiver, typically in the form of a radio frequency (RF) transceiver and an antenna 5. The first interface of the modem 4 connects via Node-B 104 enabling the modem 4 to establish a channel between itself and the UTRAN 105. With reference to FIG. 1*b*, the first interface may comprise a wired connection to an interface on the host terminal. The interface on the host terminal may comprise a wireless transceiver, typically in the form of a radio frequency (RF) transceiver and an antenna 5. The interface on the host terminal 2 connects via Node-B 104 enabling the modem 4 to establish a channel between itself and the UTRAN 105.

The modem 4 also comprises a second interface 32 for connecting to the host processor 30 on the host terminal 2. With reference to FIG. 1*a*, the second interface 32 between the host processor 30 and modem 4, could for example comprise a wired connection such as USB, or a short-range wireless transceiver such as an infrared connection or a radio frequency connection (e.g. Bluetooth). With reference to FIG. 1*b*, the second interface 32 between the host processor 30 and modem 4, could for example comprise a wired connection within the host terminal 2.

The modem 4 communicates with the UTRAN 105 in accordance with the radio interface protocol architecture 200 shown in FIG. 2.

Figure 4:
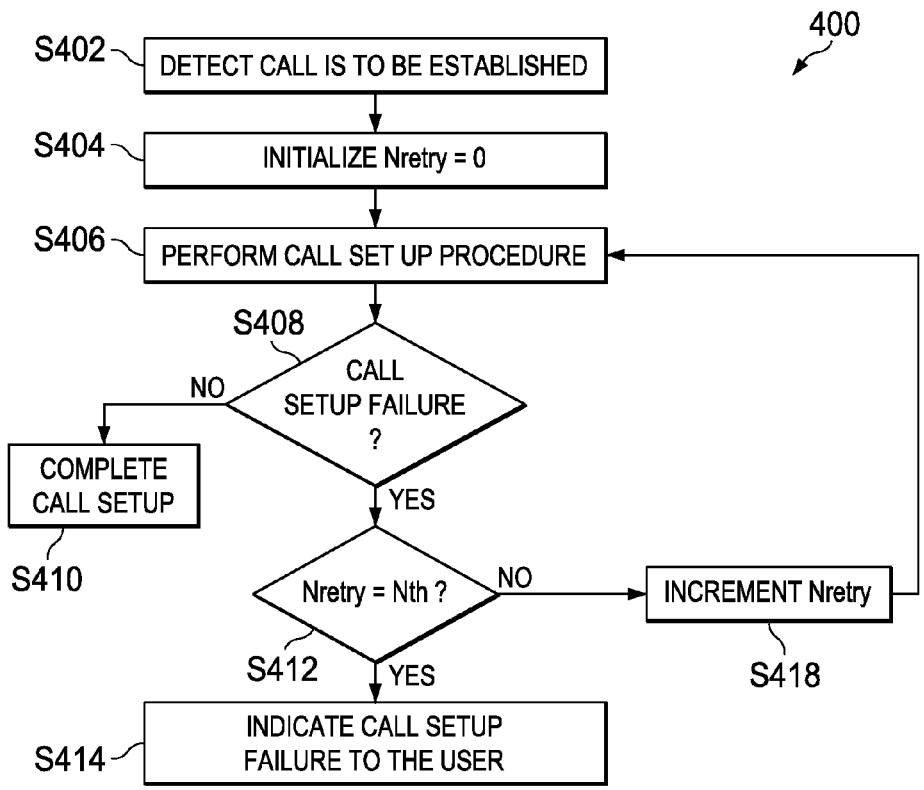
FIG. 4 is a flowchart of a call establishment procedure.
Figure 5:
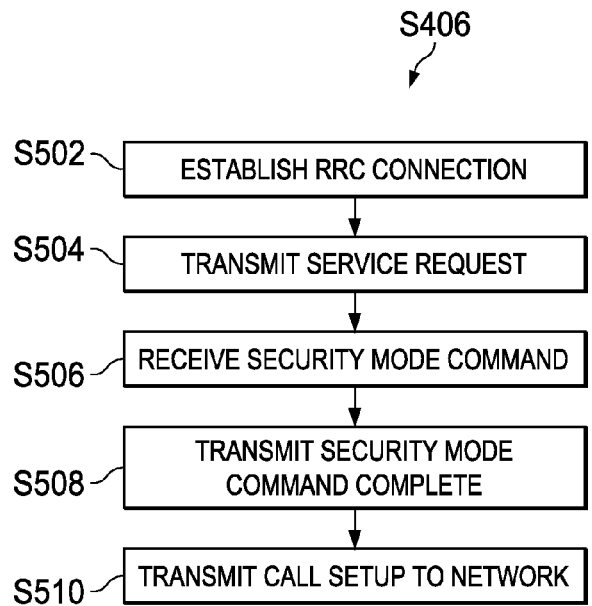
FIG. 5 is a flowchart of a sub-procedure of the call establishment procedure of FIG. 4.

FIG. 4 illustrates a call establishment procedure 400 implemented by the modem 4.

At step S402, the modem 4 detects that a call (originating from UE 102) is to be established over the UTRAN 105. The modem 4 may detect that a call is to be established over the UTRAN 105 based on receiving an AT (ATtention) command from the host processor 30 via the second interface 32 (the second interface 32 may be an AT command interface). The host processor 30 is configured to transmit an AT command indicating that a call is to be established over the UTRAN 105 to the modem 4 in response to detecting an appropriate input by a user at the host terminal 2.

At step S404, a parameter $N_{retry}$ is initialized to zero. The value of parameter $N_{retry}$ may be stored in memory 34 or in another memory location at the modem 4. The parameter $N_{retry}$ is discussed in more detail below.

Upon detecting that a call is to be established over the UTRAN 105 at step S402, the call control entity 210*a* of the modem 4 requests that the MM entity 212*a* transmits a call setup message to the UTRAN 105. The MM entity 212*a* forwards this request to the RRC layer 207.

Receipt of this request at the RRC layer 207 triggers the modem 4 to perform a call setup procedure at step S406.

The call setup procedure implemented at step S406 is now described in more detail with reference to FIG. 5.

At step S502 the RRC layer 207 establishes an RRC connection between modem 4 and the UTRAN 105. As indicated above a procedure to establish an RRC connection is described in the 3GPP 25.331 specification therefore is not described in detail herein. Once an RRC connection is established, the UE 102 is in the connected mode referred to above.

At step S504 a NAS message (i.e. a CM service request message) is transmitted from the modem 4 via the first interface 31 to the UTRAN 105 on the RRC connection established at step S502, the NAS message indicating that a mobile originating call is required.

In response to receiving the NAS message indicating that a mobile originating call is required, the UTRAN 105 initiates a Security Mode Command procedure. That is, the UTAN 105 transmits an RRC Security Mode Command with an indication of an integrity protection configuration and optionally a cipher configuration, which is received at the modem 4 at step S506.

In response to receiving the Security Mode Command from the UTRAN 105 at step S506, the modem 4 transmits an RRC Security Mode Command Complete message via the first interface 31 to the UTRAN 105 on the RRC connection established at step S502, At step S510, the UE 102 transmits a call setup message via the first interface 31 to the UTRAN 105 on the RRC connection established at step S502.

The RRC Security Mode Command Complete message and call setup message are sent by the modem 4 to the UTRAN 105 using the integrity protection configuration and cipher configuration (if ciphering is to be used) indicated in the RRC Security Mode Command.

Referring back to FIG. 4, after the call setup procedure at step S406 is performed, at step S408, the RRC layer 207 of the modem 4 determines whether the call setup has failed due to failure of the Security Mode Command procedure.

If the call setup message transmitted at step S510 is received by the UTRAN 105 after a security configuration was established (i.e. after the RRC Security Mode Command Complete message is successfully received at the UTRAN 105), the UTRAN 105 will respond with a call proceeding message to the UE 102. Therefore the RRC layer 207 of the modem 4 is able to make the determination at step S408 based on whether it receives a call proceeding message from the UTRAN 105. Upon receiving the call proceeding message, the modem 4 determines that failure of the call setup due to failure of the Security Mode Command procedure has not occurred (i.e. the Security Mode Command procedure and thus the call setup was successful) and proceeds to step S410 where the mobile originating call establishment procedure is completed. Once a connect message is received from the UTRAN 105 during the mobile originating call establishment procedure, an indication is sent from the modem 4 to the host processor 30 via the second interface 32 that the call has been established. The host processor 30 may then act on this indication to indicate (i.e. visually or audibly) the successful call establishment to the user of the host terminal 2.

If the Security Mode Command Complete message transmitted from the modem 4 to the UTRAN 105 at step S508 is not received by the UTRAN 105 within a predetermined time period from the UTRAN 105 transmitting the Security Mode Command to the modem 4, the UTRAN 105 will abort the Security Mode Command procedure. That is, the UTRAN 105 will transmit an RRC connection release message to the modem 4 to release the RRC connection established at step S502. If the RRC layer 207 of the modem 4 receives an RRC connection release message after transmitting the call setup message to the UTRAN 105, the RRC layer 207 of the modem 4 determines that the call setup has failed due to failure of the Security Mode Command procedure at step S408. Upon receiving the RRC connection release message from the UTRAN 105, the UE 102 transitions to operating in the idle mode referred to above.

After determining, at step S408, that the call setup procedure at step S406 has failed due to failure of the Security Mode Command procedure, the process 400 proceeds to step S412 where the modem 4 compares the value of parameter $N_{retry}$ to a threshold $N_{th}$. The threshold $N_{th}$ may be stored in memory 34 or in another memory location at the modem 4.

If the value of parameter $N_{retry}$ is not equal to the threshold $N_{th}$, the process proceeds to step S418. At step S418, the modem 4 increments the value of parameter $N_{retry}$ by one and the process 400 proceeds back to step S406 where the modem 4 repeats performing the call setup procedure.

That is, based on receiving the RRC connection release message from the UTRAN 105, the RRC layer 207 indicates to the MM entity 212a that the call setup procedure has failed. The MM entity 212a then forwards this indication to the call control entity 210a. The call control entity 210a then restarts the call setup procedure by requesting that the MM entity 212a transmits a call setup message to the UTRAN 105. The MM entity 212a forwards this request to the RRC layer 207. In response to the receiving this request, the RRC layer 207 at the modem 4 performs the call setup procedure at step S406.

Thus as will be apparent from the above, provided that the value of parameter $N_{retry}$ is not equal to (i.e. less than) the threshold $N_{th}$, in the event of a call setup failure due to failure of the Security Mode Command procedure the call setup failure is not indicated to the user of the host terminal 2 and the modem 4 retries to setup the call automatically by itself. Thus any repeated call setup procedure at step S406 is initiated by the modem 4 and not the user of the host terminal 2.

The check at step S412 limits the amount of retries to a certain number (e.g. $N_{th}$=2) and thus acts as a supervision mechanism to ensure that the call establishment procedure 400 does not progress into an endless loop of call setup attempts.

Referring back to step S412, if the value of parameter $N_{retry}$ is equal to the threshold $N_{th}$, then the process 500 proceeds to step S414 where the call setup failure is indicated to the user of the host terminal 2. That is, the modem 4 transmits an indication of call setup failure to the host processor 30 via the second interface 32 and the host processor 30 acts on this indication to indicate (i.e. visually or audibly) the call setup failure to the user of the host terminal 2.

It will be apparent from the above, that the present disclosure advantageously improves a user's experience as the modem 4 is able to successfully establish a mobile originating call after the call setup procedure first failing due to failure of a security mode configuration procedure, without indicating this failure to the user of the host terminal 2.

It will be appreciated that the call setup procedure at step S406 may fail due to other reasons apart from due to failure of a Security Mode Command procedure. As mere examples, the UTRAN 105 may not have a channel available for the call, the called party may be busy, the called party may not answer, or the called party may reject the call etc. These reasons are well known to persons skilled in the art and are not described in any further detail herein. In these scenarios, the UTRAN 105 transmits a message to the modem 4 indicating that the call setup could not be completed together with an indication as to why the call setup could not be completed. In response to receiving this message, the modem 4 does not perform any retry of the call setup procedure (S406). Instead, the modem 4 sends a message to the host processor 30 via the second interface 32 indicating why the call setup could not be completed. For example the modem 4 may transmit a message such as a "NO CARRIER" message, a "BUSY" message, a "NO ANSWER" message" etc. to the host processor 30 via the second interface 32. The host processor 30 may then act on this received message to indicate (i.e. visually or audibly) the failure of the call establishment to the user of the host terminal 2.

It will be appreciated that the above embodiments have been described only by way of example, and other variants or applications may be apparent to a person skilled in the art given the disclosure herein.

For instance, while embodiments above have been described in relation to certain standards such as 3GPP networks and so forth, these are not intended to be limiting and the present disclosure may in fact be applied within any communication standard of any communication network.

As noted above, the disclosure provides a modem for use at a terminal, the modem comprising: a first interface arranged to connect to a communications network; a second interface arranged to connect to a host processor on the terminal; and a processing unit, the processing unit configured to: detect that a call is to be established over the communications network; in response to said detection, perform a call setup procedure; determine if the call setup procedure has been successful or has failed due to failure of a security procedure; and in response to determining that the call setup procedure has failed due to failure of a security procedure, repeat said call setup procedure without indicating failure of the call setup procedure to a user of said terminal.

Following a repeat of said call setup procedure the processing unit may be configured to: determine if the repeated call setup procedure has been successful or has failed due to failure of a security procedure; and in response to determining that the repeated call setup procedure has failed due to failure of a security procedure, determine if a predetermined number of permitted repeats of said call setup procedure has been performed.

If the predetermined number of permitted repeats of said call setup procedure has been performed, the processing unit may be configured to indicate failure of the call setup procedure to the user of said terminal.

The processing unit may be configured to indicate failure of the call setup procedure to the user of said terminal by transmitting a call setup failure indication to the host processor via the second interface.

If the predetermined number of permitted repeats of said call setup procedure has not been performed, the processing unit may be configured to repeat said call setup procedure without indicating failure of the call setup procedure to the user of said terminal.

The processing unit may be configured to detect that a call is to be established over the communications network based on receiving an indication that a call is to be established over the communications network from the host processor via the second interface.

The processing unit may be configured to detect that a call is to be established over the communications network based on receiving an attention command from the host processor via the second interface.

The call setup procedure may comprise the processing unit: establishing a connection to the communications network; transmitting an indication that a call is required to be established to the communications network on said connection; receiving a security mode command message from the communications network on said connection; in response to receiving said security mode command message, transmitting a security mode command complete message to the communications network on said connection; and transmitting a call setup message to the communications network on said connection.

The processing unit may be configured to determine that the call setup procedure has been successful based on receiving a call proceeding message from the communications network.

The processing unit may be configured to determine that the call setup procedure has failed due to failure of a security procedure based on receiving a connection release message from the communications network on said connection.

The terminal may comprise a housing and the modem is an internal module within said terminal housing. Furthermore the second interface may comprise a wired connector or connection within said terminal housing to connect to the host processor. Furthermore the first interface may connect to a first wireless transceiver of the terminal for connecting to the network.

The modem may comprise an external unit for use at the terminal. The second interface may be a Universal Serial Bus (USB) interface. Alternatively, the second interface may comprise a second wireless transceiver for connecting to the terminal via a local wireless connection. The modem may comprise a dongle housing, the modem for plugging into the terminal via the second interface. The first interface may comprise a first wireless transceiver for connecting to the network.

The modem may comprise a mobile phone housing for connecting to the terminal via the second interface, the mobile phone thus being operable as a telephone and as an external wireless cellular modem for the terminal.

Further, although the above has been described in terms of a substantially soft modem implementation, other implementations where more or even all of the described functions are implemented in dedicated hardware are not excluded.

A portion of the above-described modems, systems or methods may be embodied in or performed by various, such as conventional, digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, modems, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this disclosure relates will appreciate that other and further additions, deletions, substitutions and modifications may be made to the described embodiments and that the disclosure is not limited by the described embodiments.

The invention claimed is:

1. A modem for use at a terminal, the modem comprising:
a first interface arranged to connect to a communications network;
a second interface arranged to connect to a host processor on the terminal; and
a processing unit, the processing unit configured to:
detect that a call is to be established over the communications network;
in response to said detection, perform a call setup procedure;
determine if the call setup procedure has been successful or has failed due to failure of a security procedure; and
in response to determining that the call setup procedure has failed due to failure of a security procedure, repeat said call setup procedure without indicating failure of the call setup procedure to a user of said terminal.

2. The modem of claim 1, wherein following a repeat of said call setup procedure the processing unit is configured to:
determine if the repeated call setup procedure has been successful or has failed due to failure of a security procedure; and
in response to determining that the repeated call setup procedure has failed due to failure of a security procedure, determine if a predetermined number of permitted repeats of said call setup procedure has been performed.

3. The modem of claim 2, wherein if the predetermined number of permitted repeats of said call setup procedure has been performed, the processing unit is configured to indicate failure of the call setup procedure to the user of said terminal.

4. The modem of claim 3, wherein the processing unit is configured to indicate failure of the call setup procedure to the user of said terminal by transmitting a call setup failure indication to the host processor via the second interface.

5. The modem of claim 2, wherein if the predetermined number of permitted repeats of said call setup procedure has not been performed, the processing unit is configured to repeat said call setup procedure without indicating failure of the call setup procedure to the user of said terminal.

6. The modem of claim 1, wherein the processing unit is configured to detect that a call is to be established over the communications network based on receiving an indication that a call is to be established over the communications network from the host processor via the second interface.

7. The modem of claim 1, wherein the processing unit is configured to detect that a call is to be established over the communications network based on receiving an attention command from the host processor via the second interface.

8. The modem of claim 1, wherein the call setup procedure comprises the processing unit:
   establishing a connection to the communications network;
   transmitting an indication that a call is required to be established to the communications network on said connection;
   receiving a security mode command message from the communications network on said connection;
   in response to receiving said security mode command message, transmitting a security mode command complete message to the communications network on said connection; and
   transmitting a call setup message to the communications network on said connection.

9. The modem of claim 1, wherein the processing unit is configured to determine that the call setup procedure has been successful based on receiving a call proceeding message from the communications network.

10. The modem of claim 1, wherein the processing unit is configured to determine that the call setup procedure has failed due to failure of a security procedure based on receiving a connection release message from the communications network on said connection.

11. The modem of claim 1, wherein the terminal comprises a housing and the modem is an internal module within said terminal housing.

12. The modem of claim 11, wherein the second interface comprises a wired connector or connection within said terminal housing to connect to the host processor.

13. The modem of claim 11, wherein the first interface connects to a first wireless transceiver of said terminal for connecting to the network.

14. The modem of claim 1, wherein the modem comprises an external unit for use at the terminal.

15. The modem of claim 14, wherein the second interface is a Universal Serial Bus (USB) interface.

16. The modem of claim 14, wherein the modem comprises a dongle housing, said modem for plugging into said terminal via the second interface.

17. The modem of claim 14, wherein the first interface comprises a first wireless transceiver for connecting to the network.

18. The modem of claim 14, wherein the second interface comprises a second wireless transceiver for connecting to the terminal via a local wireless connection.

19. The modem of claim 1, wherein the modem comprises a mobile phone housing for connecting to said terminal via the second interface, the mobile phone thus being operable as a telephone and as an external wireless cellular modem for the terminal.

20. A method of operating a modem at a terminal, the modem having a processing unit, a first interface arranged to connect to a communications network, and a second interface arranged to connect to a host processor on the terminal, wherein the method comprises:
   detecting that a call is to be established over the communications network;
   in response to said detection, performing a call setup procedure;
   determining if the call setup procedure has been successful or has failed due to failure of a security procedure; and
   in response to determining that the call setup procedure has failed due to failure of a security procedure, repeating said call setup procedure without indicating failure of the call setup procedure to a user of said terminal.

21. A computer program product for operating a modem for use at a terminal, the modem having a processing unit, a first interface arranged to connect to a communications network, and a second interface arranged to connect to a host processor on the terminal, wherein the computer program product comprises code embodied on a non-transitory computer-readable medium and configured so as when executed on the processing unit of said modem to: detect that a call is to be established over the communications network; in response to said detection, perform a call setup procedure; determine if the call setup procedure has been successful or has failed due to failure of a security procedure; and in response to determining that the call setup procedure has failed due to failure of a security procedure, repeat said call setup procedure without indicating failure of the call setup procedure to a user of said terminal.

* * * * *